US012792916B2

(12) United States Patent
Abdulhkim et al.

(10) Patent No.: US 12,792,916 B2
(45) Date of Patent: Nov. 10, 2026

(54) AUTOMATED DESIGN OF ARCHITECTURES OF ARTIFICIAL NEURAL NETWORKS

(71) Applicant: ANSYS, INC., Canonsburg, PA (US)

(72) Inventors: Anas Abdulhkim Aburawwash Abdulhkim, Weimar (DE); Lars Gräning, Andisleben (DE); Thomas Most, Vollersroda (DE)

(73) Assignee: ANSYS, INC., Canonsburg, PA (US)

( * ) Notice: Subject to any disclaimer, the term of this patent is extended or adjusted under 35 U.S.C. 154(b) by 941 days.

(21) Appl. No.: 17/806,837

(22) Filed: Jun. 14, 2022

(65) Prior Publication Data

US 2022/0405599 A1 Dec. 22, 2022

Related U.S. Application Data

(60) Provisional application No. 63/211,185, filed on Jun. 16, 2021.

(51) Int. Cl.
*G06N 3/082* (2023.01)
*G06N 3/048* (2023.01)

(52) U.S. Cl.
CPC ............ *G06N 3/082* (2013.01); *G06N 3/048* (2023.01)

(58) Field of Classification Search
CPC .............................. G06N 3/082; G06N 3/048
See application file for complete search history.

(56) References Cited

U.S. PATENT DOCUMENTS

2019/0294955 A1* 9/2019 Uchida .................. G06N 20/20
2019/0325313 A1* 10/2019 Shamir ............ G06F 18/21322
2019/0340511 A1* 11/2019 Yous .................... G06N 3/0464
2021/0350239 A1* 11/2021 Wang .................... G06F 18/213
2022/0215263 A1* 7/2022 Nachum ................ G06N 3/082

OTHER PUBLICATIONS

Min et al. "Dropnet: Reducing neural network complexity via iterative pruning." International conference on machine learning. PMLR , 2020. (Year: 2020).*
F. J. Maldonado, M. T. Manry, Optimal Pruning of Feedforward Neural Networks Based upon the Schmidt Procedure, 0-7803-7576-9/02, 2002 IEEE, 6 pages.
Chen Yang, Zhenghong Yang, Abdul Mateen Khattak, Liu Yang, Wenxin Zhang, Wanlin Gao, Minjuan Wang, '"Structured Pruning of Convolutional Neural Networks via L1 Regularization", published Aug. 15, 2019, 10 pages.

* cited by examiner

*Primary Examiner* — Eric Nilsson
(74) *Attorney, Agent, or Firm* — WOMBLE BOND DICKINSON (US) LLP

(57) ABSTRACT

A method and apparatus of a device of determining a reduced space neural network architecture is described. In an exemplary embodiment, the device receives a full space neural network architecture, wherein the full space architecture includes a first plurality of nodes and a set of weights. The device may further transform the set of weights. In addition, the device may also reduce the first plurality of nodes using the transformed set of weights to create second plurality of nodes. Furthermore, the device can create the reduced space neural network architecture using the second plurality of nodes.

20 Claims, 8 Drawing Sheets

500

AUTOMATED DESIGN OF ARCHITECTURES OF ARTIFICIAL NEURAL NETWORKS

This application claims the benefit of the filing date of U.S. provisional patent application No. 63/211,185, which was filed on Jun. 16, 2021 by Applicant Ansys, Inc., and this provisional patent application is hereby incorporated herein by reference.

FIELD OF INVENTION

This invention relates generally to neural network and more particularly to an automated design of architecture of artificial neural networks.

BACKGROUND OF THE INVENTION

Artificial Neural Networks (ANN) are widely used in engineering as surrogate for high fidelity simulations or as digital twin of a technical system for an efficient computational product design. However, the quality and as such the reliability of the model or the area of application strongly depend on the architecture of the ANN model. Besides the actual network topology (The type of model like Feed-Forward structure, recurrent network structure, or others), the architecture is mainly defined by the number of layers, the number of neurons per layer, the chosen input features and a set of other hyper-parameter like learning rate or activation function.

In prior art mainly two approaches are applied to identify the optimal parameterization of artificial neural networks: (1) using expert knowledge, or (2) brute force computational optimization approach. Approach (1) requires detailed knowledge about the theory and the practical application of neural-networks—which often hinders the use of this type of models in engineering or other business areas. Approach (2) approaches the identification of the optimal network topology and hyperparameter configuration using computational optimization approaches, requires a large number of repetitive network trainings, which is often impractical due to the high computational expensive.

SUMMARY OF THE DESCRIPTION

A method and apparatus of a device of determining a reduced space neural network architecture is described. In an exemplary embodiment, the device receives a full space neural network architecture, wherein the full space architecture includes a first plurality of nodes and a set of weights. The device may further transform the set of weights. In addition, the device may also reduce the first plurality of nodes using the transformed set of weights to create second plurality of nodes. Furthermore, the device can create the reduced space neural network architecture using the second plurality of nodes.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
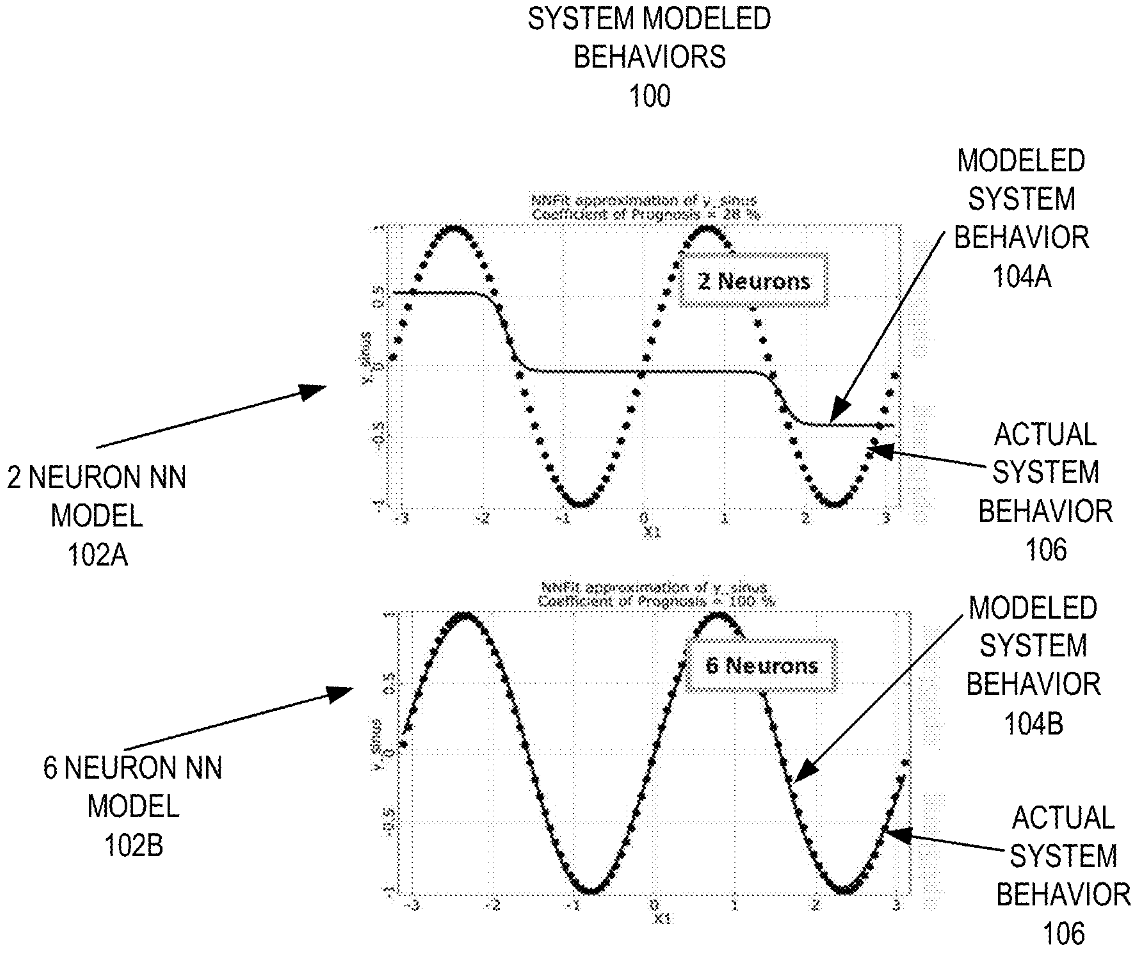
FIG. 1 is an illustration of one embodiment of two different neural network models for modeling a curve.

A method and apparatus of a device determining a neural network architecture is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device determining a neural network architecture is described. In one embodiment, Artificial Neural Networks (ANN) are widely used in engineering as surrogate for high fidelity simulations or as digital twin of a technical system for an efficient computational product design. However, the quality and as such the reliability of the model or the area of application strongly depend on the architecture of the ANN model. Besides the actual network topology (The type of model like Feed-Forward structure, recurrent network structure, or others), the architecture is mainly defined by the number of layers, the number of neurons per layer, the chosen input features and a set of other hyper-parameter like learning rate or activation function. The inputs and/or neurons in the architecture can be collectively labelled as a node of the architecture. In particular, the inputs are the layer 0 nodes of the architecture and the neurons are part of the hidden layers of the architecture (e.g., layers 1 . . . N−1 of an N-layer architecture.

In prior art mainly two approaches are applied to identify the optimal parameterization of artificial neural networks: (1) using expert knowledge, or (2) brute force computational optimization approach. Approach (1) requires detailed knowledge about the theory and the practical application of neural-networks—which often hinders the use of this type of models in engineering or other business areas. Approach (2) approaches the identification of the optimal network topology and hyperparameter configuration using computational optimization approaches, requires a large number of repetitive network trainings, which is often impractical due to the high computational expensive.

In one embodiment, an efficient solution is provided to automatically reduce the input parameter space, as well as the number of hidden units, achieving an improved prediction quality in practice. The procedure requires a minimum of additional network trainings by utilizing regularization techniques and by inferring necessary information for the reduction from the analysis of the network weights.

In one embodiment, there can be two classes of pruning strategies exists: weight pruning and node pruning. This proposed solution can be classified as node pruning algorithm, but is a different strategy for deciding about the termination of the pruning procedure based on node sensitivity information regarding the estimated prediction quality. The proposed solution targets the identification of an optimal subspace and the optimal set of neurons per hidden layer simultaneously using one offline algorithm that does not require expensive re-trainings. Furthermore, the combination of regularized network training with Gram-Schmidt weight transformation provides an optimal basis for the successive elimination of unimportant neurons. Embedding into competition framework to automatically select the overall best model, with neural network being one out of several model types.

FIG. 1 is an illustration of one embodiment of two different neural network models for modeling a curve with a system of modeled 100. In FIG. 1, the different modeled system behaviors illustrate the dependency of the model quality on the ANN model parameters like the number of neurons per layer. In this embodiment, there are two different modeled system behavior 104A-B for an actual system behavior 106. In one embodiment, the modeled system behavior is where the system behavior or simulation follows a sinus wave characteristic. Here, the target is to derive a model that is most accurate with respect to the prediction of previously unknown data. The overall quality of the model is evaluated by the Coefficient of Prognosis (CoP). It can be seen that a wrong choice of the number of neurons, two in this case, leads to a low expected prediction/prognosis quality.

In one embodiment, a two neuron neural network (NN) model 102A is a poor predictor of the actual system behavior 106. In this embodiment, the model system behavior of the two neuron NN model 102A does not replicate the values or the amplitudes of the actual system behavior. In one embodiment, the coefficient of prognosis is 28% for the two neuron NN model 102A. In contrast, the six neuron NN model 102B more closely models the actual system behavior, by more closely replicating the values and amplitudes of the actual system behavior. In one embodiment, the coefficient of prognosis is 100% for the six neuron NN model 102B.

In one embodiment, simply adding additional neurons (or inputs, or other parameters) does not necessarily improve the modeling capability of a NN. There can be at least two problems with just adding more input parameters or neurons: (1) Overfitting and (2) a need for Network Pruning before deploying to production/mobile/TOT devices. In one embodiment, overfitting is a problem where a NN model can learn the features of the training set extremely well, but the model cannot generalize and cannot predict for inputs that are outside of scope of the training data. In a further embodiment, the network pruning is used to create a smaller NN for use in production on devices with more limited resources in terms of storage, memory, and/or processing resources. For example, and in one embodiment, a smartphone may be limited in the amount of memory or processing resources used for NN processing. Thus, it makes sense to have a smaller NN model for use on the smartphone, so as work within the memory and/or process resource limits of that smartphone.

Figure 2:
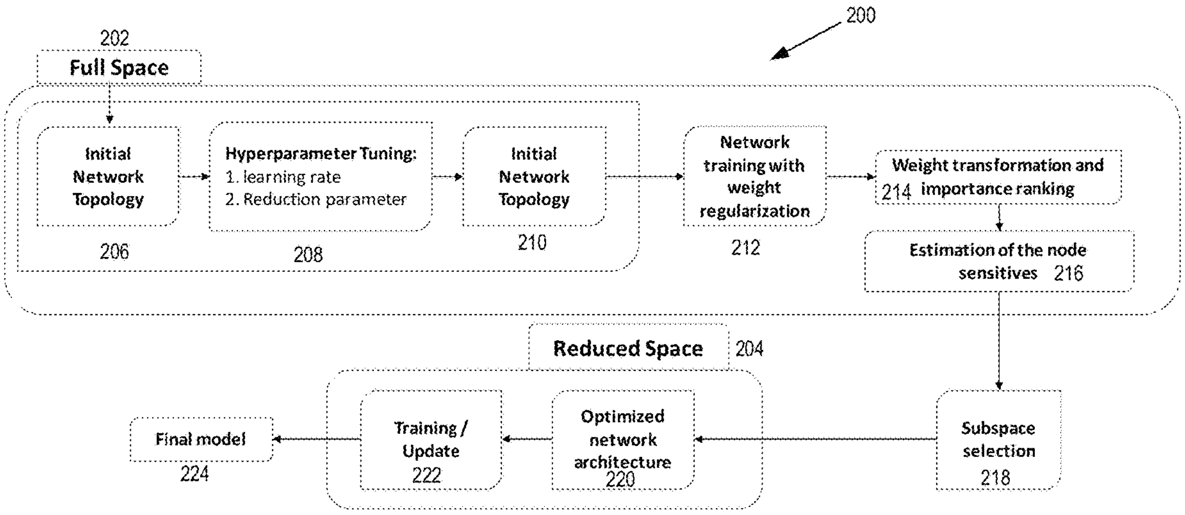
FIG. 2 is a flow diagram of one embodiment of a process for generating neural network model by selecting a subspace solution.

FIG. 2 is a flow diagram of one embodiment of a process 200 for generating neural network model by selecting a subspace solution. In one embodiment, a modeling device (not illustrated) can execute process 200, where the modeling device can be one or more of a personal computer, laptop, server, mobile device (e.g., smartphone, laptop, personal digital assistant, music playing device, gaming device, etc.), and/or any device capable processing data. In FIG. 2, process 200 executes is full space 202 and reduced space 204. In one embodiment, full space 202 is the full space of all the possible inputs and neurons for the NN model. The reduced space 204 is a NN model with a smaller number of inputs parameters and/or neurons than in the full space. In one embodiment, process 200 determines which of the input parameters and/or neurons are important and which of the inputs parameters and/or neurons are not important for the NN model. In Figure, process 200 begins by receiving the initial network topology at block 206. In one embodiment, the initial network topology is the starting point of the procedure and is a fully connected neural network structure including all considered input parameters. At block 208, process 200 performs hyperparameter training. In one embodiment, process 200 performs hyperparameter training by determining a learning rate and a reduction parameter. In this embodiment, due to the automated procedure for identifying the optimal input space and set of neurons the hyperparameter search can be reduced to a minimal set of parameters. For example, and in one embodiment, process 200 tunes the regularization factor that defines the strength of the weight regularization. In this embodiment, parameters that can be changed or tuned at block 208 can include changes to parameters of the training procedure of the network such as learning rate and the reduction parameter, and/or can also include additional parameters such as activation function, batch size, and/or other types of parameters associated with the NN model training except topology of the input and hidden layer(s). Process 200 outputs an updated initial network topology at block 210. In one embodiment, this is the initial network topology with updated hyperparameters.

At block 212, process 200 performs network training with weight regularization. In one embodiment, process 200 performs the network training (tuning to the given training data) using regularization to penalize high network weights, such that unimportant weights in the network tend towards zero weight values. Without loss of generality, in the prescribed procedure uses L1 regularization, which provides a huge advantage over L2 regularization in the context of eliminating unimportant or redundant weights/nodes. As a result of adding L1 regularization term to the objective function, the weights of the optimized neural network consist of spares solution (which is in contrast to other common regularization methods). As shown in equations below and in one embodiment, the analytical solution of minimizing the quadratic function. Network training is further described in FIG. 3 below.

Process 200 performs a weight transformation and importance ranking at block 214. The trained network weights are the basis for inferring information about important and unimportant weights. Gram-Schmidt transformation of the weight matrix is applied to retrieve a weight representation that emphasizes the difference between important and unimportant weights. It performs a transformation from correlated space of the original W to orthonormal space Q, thus R matrix represents the vectors of the neurons in the transformed space.

$$[W]=[Q][R]$$

Removing the correlation in the R space, hence, providing a clear limit between the neurons, which makes it an efficient method to rank the weights of neurons. Incorporating this method of transformation with sparsity solution driven by regularization, preventing from the removal of important weights, as it is a common shortcoming in related pruning techniques. Weight transformation and importance ranking is further described in FIGS. 4-6 below.

At block 216, process 200 determines an estimation of node sensitivities. In one embodiment, the vector norm of the transformed network weights provides sensitivity information for each node in the network. In addition, sorting the nodes with respect to the sensitivities allows the ranking of the nodes for each individual network layer. Estimation of node sensitivities is further described in FIG. 6 below. Process 200 selects the subspace at block 218. With the selection of the subspace, process 200 has created a reduced space 204 that can be used to create a final model. In one embodiment, process 200 selects the optimized subset of nodes the procedure is as follows. For each node or for a cluster of nodes, processed in the order of the ranking and starting with the lowest rank, the corresponding weights are set to zero weight and the network performance, by means of the expected prediction quality, is calculated based on a cross-validation scheme. If the performance is above a certain tolerance level the processed neuron is removed from the network. All remaining nodes define the architecture of the optimized network. The described procedure runs in an offline mode, without the necessity for expensive retraining steps.

In the reduced space 204, process 200 outputs the optimizes the network architecture at block 220. In one embodiment, the optimized network architecture can include one or more of selected subspace of inputs, selected subspace of hidden layers, and/or optimized hyperparameters. At block 222, process 200 performs training and/or updates to the NN architecture. Process 200 outputs the final model at block 224. In one embodiment, by transforming the weights and reducing the number of inputs and/or neurons from the NN model, process 200 does not rely on expert knowledge of the particular subject matter of the underlying data of the model. Instead, process 200 identifies and removes inputs and/or neurons that do not affect the performance of the NN model.

Figure 3:
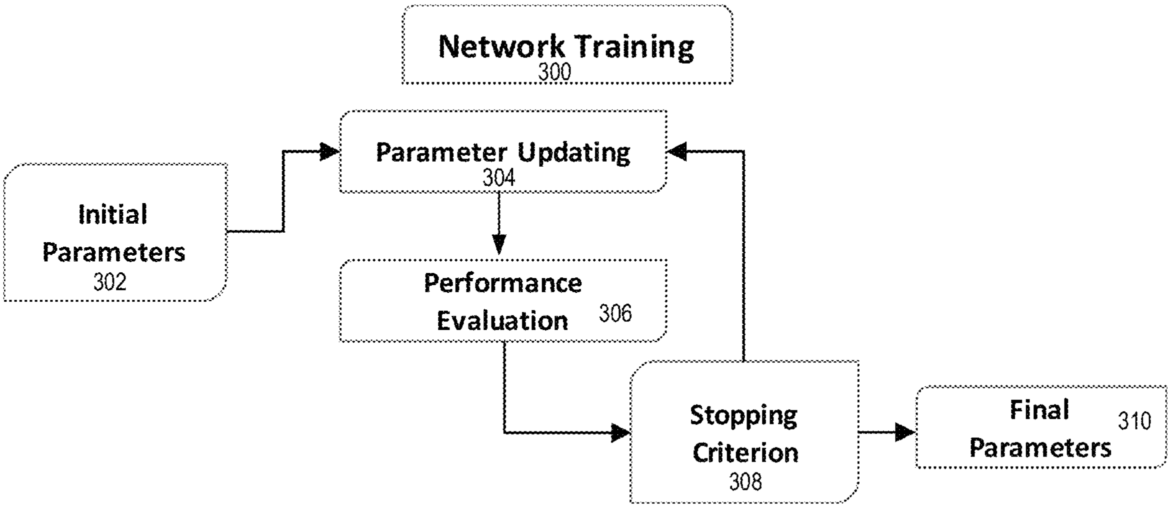
FIG. 3 is a flow diagram of one embodiment of a process for network training.

FIG. 3 is a flow diagram of one embodiment of a process for network training. In FIG. 3, process 300 begins by receiving the initial parameters at block 302. In one embodiment, that initial parameters are updated by process 300 at block 304. In one embodiment, the network training (tuning to the given training data) is done using regularization to penalize high network weights, such that unimportant weights in the network tend towards zero weight values. Without loss of generality, in the prescribed procedure we are using L1 regularization, which provides a huge advantage over L2 regularization in the context of eliminating unimportant or redundant weights/nodes. As a result of adding L1 regularization term to the objective function, the weights of the optimized neural network consist of spares solution. In contrast to other common regularization methods. As shown in equations below of the analytical solution of minimizing the quadratic function.

In one embodiment, process 300 performs the weight regularization by adding a regularization term to the objective function J, so that the regularized objective function $\tilde{J}$ becomes $$\tilde{J}(W)=J(W)+\alpha\Omega(W)\ \alpha[0,\infty)$$

where, J(W) is the objective function, $\tilde{J}(W)$ is the regularized objective function, and $\alpha$ is the regularization parameter. In one embodiment, if $\alpha$ is increased, more regularization results. Alternatively, if $\alpha=0$, there is no regularization. In a further embodiment, for L1 regularization, $$\tilde{J}(W) = J(W) + \alpha\|W\|_1$$

$$\tilde{w}_i = \text{sign}(w_i^*)\max\left\{|w_i^*| - \frac{\alpha}{H_{i,i}}, 0\right\}$$

In addition, process 300 performs a performance evaluation using training data at block 306. In one embodiment, the training data is split into a set of training and a set of validation data. In this embodiment, the training data is shown to the network and updating the weights by an optimization method (e.g., Back propagation, Stochastic gradient decent or another optimization method). In one embodiment, in block 306, process 300 computes the prediction error regarding the training data set and the validation data set are calculated. In this embodiment, while the error on the training data tends to get smaller and smaller during the optimization of the weights, the error on the validation data set typically will increase at some point of the optimization. If this happens, process 300 will stop the training to prevent overfitting. This "early stopping" is a well-known strategy for the weight optimization (training). At block 308, process 300 determines if the network training stops. In one embodiment, process 300 determines whether to stop the network training by monitoring the training and the validation error as described above. If the network training is complete, process 300 outputs the final parameters at block 310. If the network training is not complete, process 300 proceeds to block 304 for further parameter updating.

In one embodiment, the trained network weights are the basis for inferring information about important and unimportant weights. Gram-Schmidt transformation of the weight matrix is applied to retrieve a weight representation which emphasizes a difference between important and unimportant weights. It performs a transformation from correlated space of the original W to orthonormal space Q, thus R matrix represents the vectors of the neurons in the transformed space.

$$[W]=[Q][R]$$

Removing the correlation in the R space, hence, providing a clear limit between the neurons, which makes it an efficient method to rank the weights of neurons. Incorporating this method of transformation with sparsity solution driven by regularization, preventing from the removal of important weights, as it is a common shortcoming in related pruning techniques.

Figure 4:
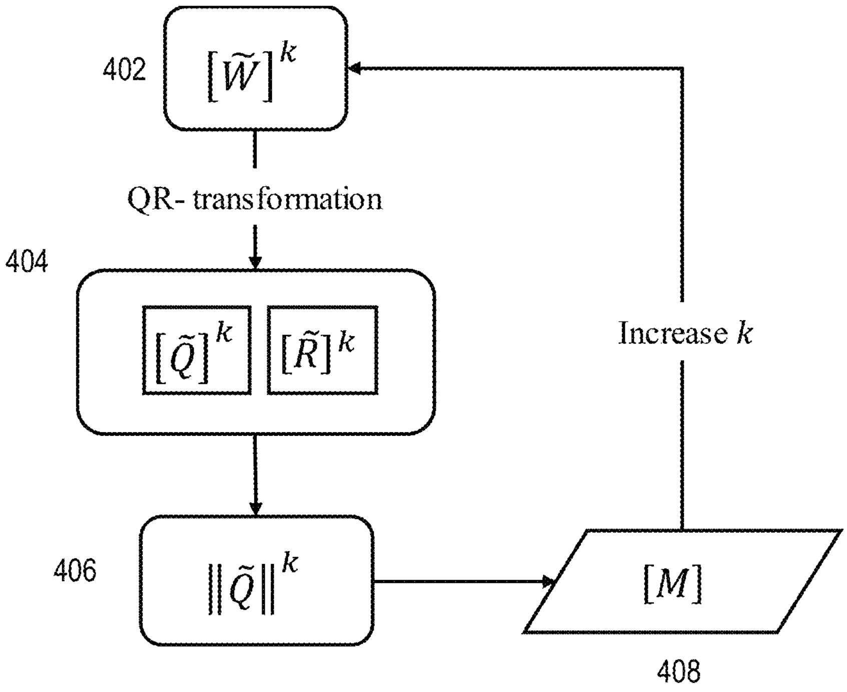
FIG. 4 is a flow diagram of one embodiment of a process for transforming the weights of the neural network.

FIG. 4 is a flow diagram of one embodiment of a process 400 for transforming the weights of the neural network. In FIG. 4, process 400 beings by receiving the regularized weights of layer k, $[\tilde{W}]^k$ at block 402. In one embodiment, the regularized weights are the weights as computed in FIG. 3 above. At block 404, process 400 decomposes $[\tilde{W}]^k$ to $[\tilde{Q}]^k[\tilde{R}]^k$ by using a Gram-Schmidt transformation. Process 400 computes the activation of each neuron $\|\tilde{Q}\|^k$ by computing the length of its components of $[\tilde{Q}]^k$ at block 406. At block 408, process 400 stacks the $\|\tilde{Q}\|^k$ in a matrix [M]. In one embodiment, [M] represents the neurons activation map. If there are more layers to process, process 400 increases k and proceeds to block 402 above.

Figure 5:
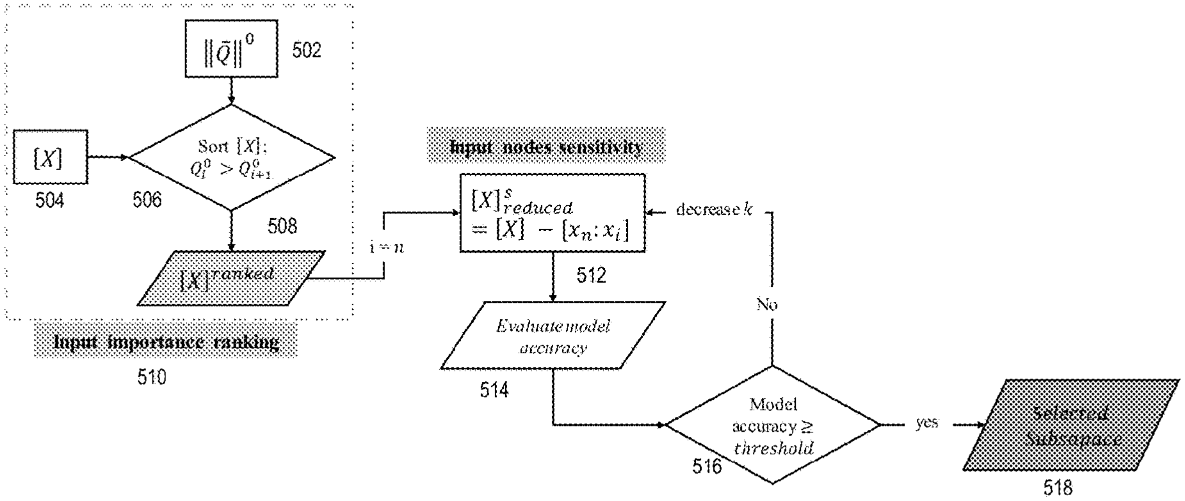
FIG. 5 is a flow diagram of one embodiment of a process of generating a selected subspace for the neural network.

FIG. 5 is a flow diagram of one embodiment of a process 500 of generating a selected subspace for the neural network inputs. In FIG. 5, process 500 begins by receiving the activation of the first layer $\|\tilde{Q}\|^0$ and the inputs [X] at block 502 and 504. At block 506, process 500 sorts inputs [X] descendingly according to the corresponding activation value, so $$Q_i^0 > Q_{i+1}^0.$$

At block 508, process 500 now has a set of ranked inputs, $[X]^{ranked}$.

At block 512, process 500 removes the lowest important input to creates a reduced set of input:

$$[X]_{reduced}^s = [X] - [x_n : x_i].$$

In one embodiment, the lowest important input can be removed by input not meeting a threshold for the activation values, can be the last Y % of input, a metric based on the evaluated/estimated model accuracy, or some other metric. Process 500 evaluates the model accuracy at block 514. In one embodiment, process 500 evaluates the model accuracy by comparing the results of the model with the different set of data. For example, and in one embodiment, training and validation sets, which are used for the weight optimization, but another portion of the available data is split by means of creating a test data set. Thus, three data sets are available: a training set, a validation set; and a test set. In one embodiment, the evaluation of the model accuracy can be done based on the test set. A metric model accuracy can be CoP. In one embodiment, the model accuracy can be measured with CoP using cross-validation. At block 516, process 500 determines if the model accuracy greater than or equal to a threshold. If the model accuracy is less than the threshold, process 500 decreases k and proceeds to block 512 above. If the model accuracy is greater than or equal to the threshold, process 500 selects the subspace at block 518.

Figure 6:
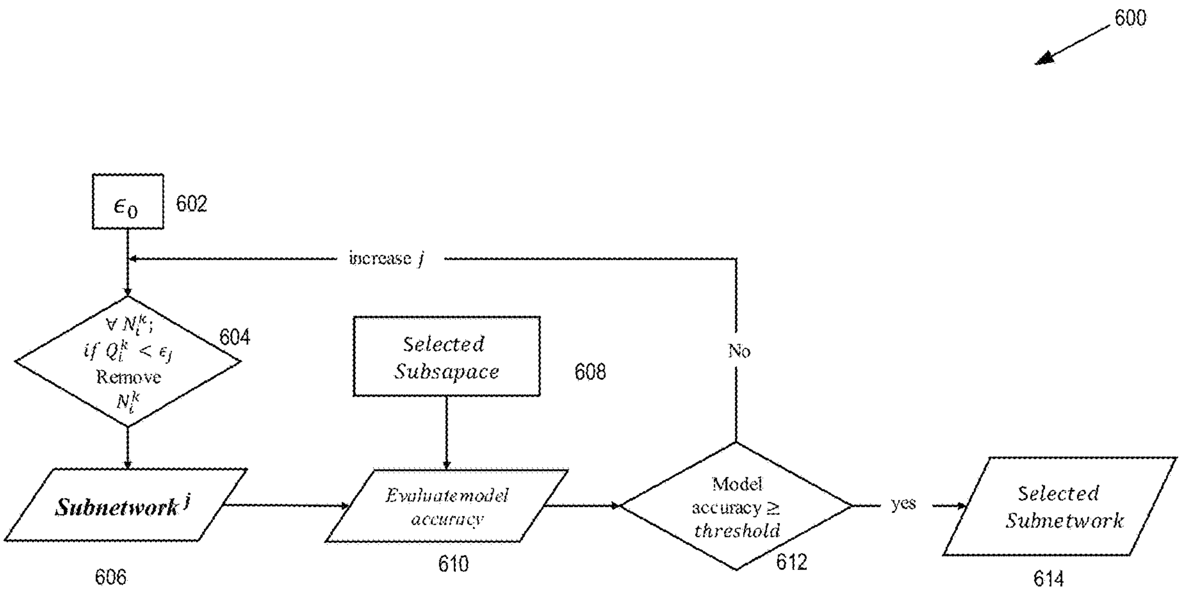
FIG. 6 is a flow diagram of one embodiment of a process for selecting a subnetwork of the neural network.

By choosing a subspace, less inputs are used in the NN model calculation. In addition to or instead, the network used for the NN model can be reduced by reducing the number of neurons that are used in the NN. FIG. 6 is a flow diagram of one embodiment of a process 600 for selecting a subnetwork of the neural network. In FIG. 6, process 600 begins by defining a random subnetwork thresholds [$\epsilon$] at block 602. In one embodiment, the random subnetwork thresholds [$\epsilon$] is ordered. At block 604, process 600 applies the threshold $\epsilon_j$ and remove all neurons below this threshold. In one embodiment, $$\forall N_i^k; \text{if } Q_i^k < \epsilon_j,$$

remove $$N_i^k.$$

The remaining neurons will define a $subnetwork^j$ (block 606). Process 600 evaluates the model accuracy at block 610. In one embodiment, the model accuracy can be measured with CoP using cross-validation. If the model accuracy is greater than or equal to a threshold, process 600 selects the $subnetwork^j$ to use for the NN model. Alternatively, if the model accuracy less than the threshold, process 600 increase j and execution proceeds to block 604 above.

Figure 7:
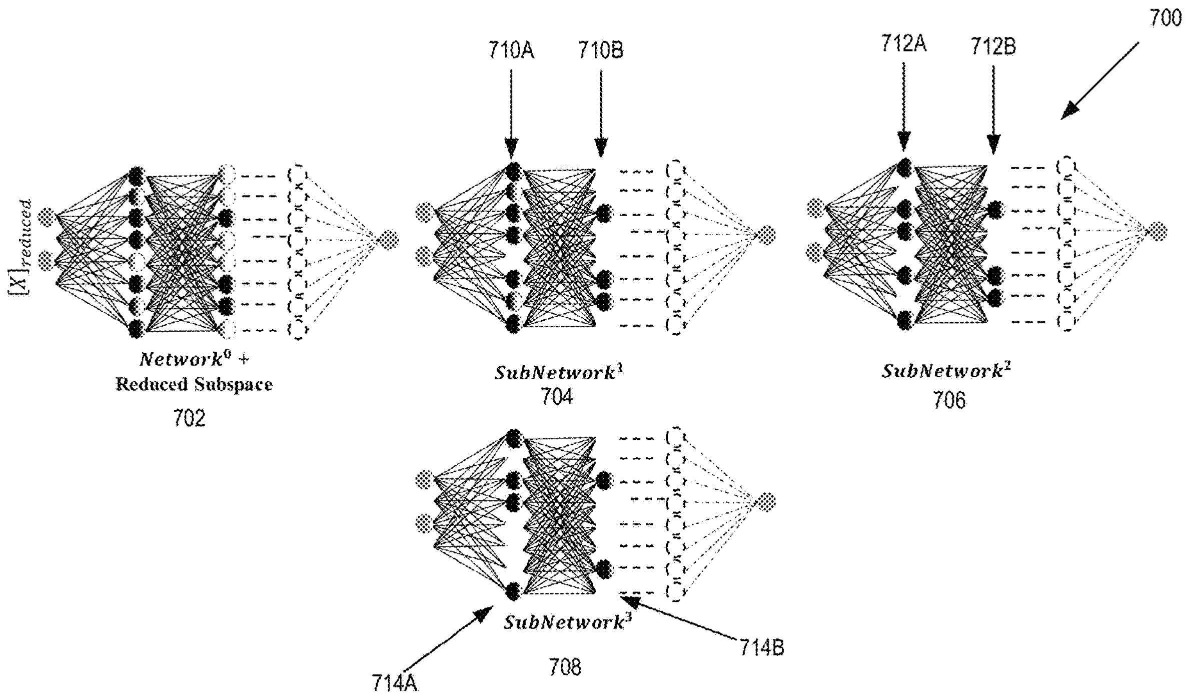
FIG. 7 is an illustration of one embodiment of selecting a subnetwork.

In one embodiment, process 600 works by iteratively removing neurons form the NN model until removing too many neurons greatly affects the NN model. FIG. 7 is an illustration 700 of one embodiment of selecting a subnetwork. In FIG. 7, the input into process 600 is the full space network with the reduce set of inputs (702). In one iteration, some of neurons of the $subnetwork^1$ have been removed. For example, and in one embodiment, one neuron is removed from layer 710A and five neurons has been removed from layer 710B. In the next iteration, process 600 removes an additional two neurons in layer 712A but none from layer 712B to create $subnetwork^2$ 706. In a further iteration, $subnetwork^3$ is created by removing a neuron from layer 714A and another neuron from later 714B.

In one embodiment, Table 1 below illustrates a comparison of different meta-models trained on a real-world dataset from engineering. As can be seen the neural network quality that was built with the proposed approach clearly outperforms (by means of measuring the performance on an independent test data set) neural networks trained with traditional attempts.)

TABLE 1

Comparison of proposed framework with other full space models.

| Coefficient of Determination (COD) | Kriging Anisotropic Full space | Kriging Isotropic filtering | Basic Feed-forward Full space | L1 - Regularized Model Full space | L2 - Regularized Model Full space | Proposed Framework |
|---|---|---|---|---|---|---|
| Training Data | 100% | 99.95% | 99.84% | 99.52% | 99.96% | 99.29% |
| Cross Validation | 98.64% | 97.29% | 99.20% | 98.03% | 99.79% | 97.70% |
| Independent Test Set | 98.34% | 95.55% | 70.95% | 90.06% | 70.99% | 96.50% |

In Table 1, the proposed framework compares well with the test versus other full space model. In particular, the proposed framework performed well with the independent test set with a COD of 96.50%. This compares well, for example, with the results of the L2—regularized model (full space) (70.99%) and Basic Feed-Forward (full space) (70.95%). In addition, this improves the functioning of the computing device because by reducing the space of the inputs and/or subnetworks, there are less numbers of inputs and/or less numbers of neurons for the computing device to process. Thus, the computing device will execute more efficiently because of the reduced NN model.

Figure 8:
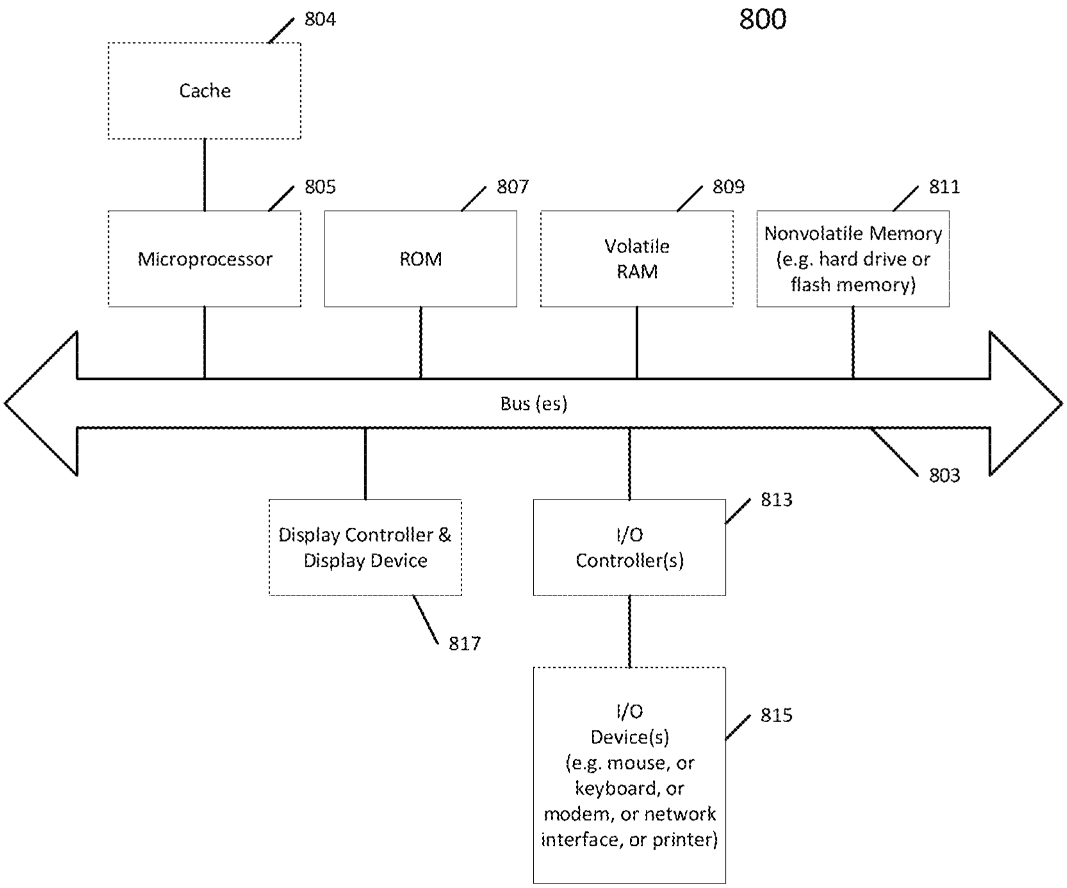
FIG. 8 illustrates one example of a typical computer system, which may be used in conjunction with the embodiments described herein.

FIG. 8 shows one example of a data processing system 800, which may be used with one embodiment of the present invention. For example, the system 800 may be implemented as a system that executes process 200 as shown in FIG. 2 above. Note that while FIG. 8 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may include one or more CPU(s), GPU(s), a specialized processor, and/or a combination thereof The microprocessor 805 may retrieve the instructions from the memories 807, 809, 811 and execute the instructions to perform operations described above. The bus 803 interconnects these various components together and also interconnects these components 805, 808, 809, and 811 to a display controller and display device 819 and to peripheral devices such as input/output (I/O) devices which may be mice, keyboards, modems, network interfaces, printers and other devices which are well known in the art. Typically, the input/output devices 815 are coupled to the system through input/output controllers 813. The volatile RAM (Random Access Memory) 808 is typically implemented as dynamic RAM (DRAM), which requires power continually in order to refresh or maintain the data in the memory.

The mass storage 811 is typically a magnetic hard drive or a magnetic optical drive or an optical drive or a DVD RAM or a flash memory or other types of memory systems, which maintain data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "training," "predicting," "sorting," "evaluating," "removing," "reducing," "computing," "computing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to determine a reduced space neural network architecture, the method comprising:

receiving a full space neural network architecture, wherein the full space architecture includes a first plurality of nodes and a set of weights;

transforming the set of weights into a transformed space;

ranking the transformed set of weights in the transformed space, each of the first plurality of nodes associated with a respective weight of the transformed set of weights, wherein the ranking of each weight in the transformed set of weights is based on a node sensitivity of the associated node determined using a vector norm of the transformed weight;

creating a second plurality of nodes less than the first plurality of nodes, wherein the second plurality of nodes is created iteratively by:

(i) reducing a number of nodes in the first plurality of nodes to form a subnetwork of the full space neural network architecture using the ranking of associated weights in the transformed set of weights, (ii) evaluating output accuracy of the subnetwork, and (iii) further reducing the number of nodes by repeating (i) and (ii) for as long as an output accuracy of the subnetwork equals or exceeds a threshold accuracy; and creating the reduced space neural network architecture using the second plurality of nodes.

2. The non-transitory machine-readable medium of claim 1, the method further comprising:

regularizing the set of weights.

3. The non-transitory machine-readable medium of claim 2, wherein the transforming the set of weights further comprises:

computing an activation for each of the first plurality of nodes using the regularized set of weights.

4. The non-transitory machine-readable medium of claim 3, wherein the reducing comprises:

determining a threshold, wherein the first plurality of nodes includes a first set of neurons;

removing a neuron from the first set of neurons based on a comparison of the activation and the threshold.

5. The non-transitory machine-readable medium of claim 4, wherein the full space neural network architecture includes a plurality of layers and the neuron is removed from at least two different layers of the plurality of layers.

6. The non-transitory machine-readable medium of claim 1, wherein the transformation is a Gram-Schmidt transformation.

7. The non-transitory machine-readable medium of claim 1, wherein the first plurality of nodes includes a first set of inputs and method further comprises:

reducing the first set of inputs using the ranked set of weights to create a second set of inputs.

8. The non-transitory machine-readable medium of claim 7, wherein the reducing the first set of input comprises:

sorting the first set of inputs.

9. The non-transitory machine-readable medium of claim 8, the method further comprising:

removing lower N inputs;

evaluating a model accuracy; and reducing the first set of inputs when the model accuracy is greater than or equal to a threshold.

10. The non-transitory machine-readable medium of claim 1, further comprising:

evaluating a model accuracy with the second plurality of nodes.

11. A non-transitory machine-readable medium having executable instructions to cause one or more processing units to perform a method comprising:

receiving a neural network model to predict an output from a set of inputs, the neural network model including a plurality of nodes, each node is respectively associated with one or more weights, wherein weights of the plurality of nodes correspond to a weight matrix;

transforming the weights of the plurality of nodes to a transformed space for representing the weight matrix with an orthogonal basis;

ranking the transformed weights of the plurality of the nodes in the transformed space, each of the plurality of nodes associated with a respective weight of the transformed set of weights, wherein the ranking of each weight in the transformed set of weights is based on a node sensitivity of the associated node determined using a vector norm of the transformed weight;

selecting a subnetwork of the neural network model, wherein, starting with a number of nodes in the plurality of nodes, the subnetwork is created iteratively by:

(i) eliminating one or more nodes from the plurality of nodes to form the subnetwork using the ranking of associated weights in the transformed set of weights, (ii) evaluating an output accuracy of the subnetwork, and (iii) further eliminating nodes by repeating (i) and (ii) for as long as the output accuracy of the subnetwork equals or exceeds a threshold accuracy; and generating a reduced space neural network using the selected subnetwork, wherein the reduced space neural network predicts the output from the set of inputs within a tolerance level.

12. A method to determine a reduced space neural network architecture, the method comprising:

receiving a full space neural network architecture, wherein the full space neural network architecture includes a first plurality of nodes and a set of weights;

transforming the set of weights into a transformed space;

ranking the transformed set of weights in the transformed space, each of the first plurality of nodes associated with a respective weight of the transformed set of weights, wherein the ranking of each weight in the transformed set of weights is based on a node sensitivity of the associated node determined using a vector norm of the transformed weight;

creating a second plurality of nodes less than the first plurality of nodes, wherein the second plurality of nodes is created iteratively by:

(i) reducing a number of nodes in the first plurality of nodes to form a subnetwork of the full space neural network architecture using ranking of associated weights in the transformed set of weights, (ii) evaluating an output accuracy of the subnetwork, and (iii) further reducing the number of nodes by repeating (i) and (ii) for as long as the output accuracy of the subnetwork equals or exceeds a threshold accuracy; and creating the reduced space neural network architecture using the second plurality of nodes.

13. The method of claim 12, the method further comprising:

regularizing the set of weights.

14. The method of claim 13, wherein the transforming the set of weights further comprises:

computing an activation for each of the first plurality of nodes using the regularized set of weights.

15. The method of claim 14, wherein the reducing comprises:

determining a threshold, wherein the first plurality of nodes includes a first set of neurons;

removing a neuron from the first set of neurons based on a comparison of the activation and the threshold.

16. The method of claim 15, wherein the full space neural network architecture includes a plurality of layers and the neuron is removed from at least two different layers of the plurality of layers.

17. The method of claim 12, wherein the transformation is a Gram-Schmidt transformation.

18. The method of claim 12, wherein the first plurality of nodes includes a first set of inputs and the method further comprises:

reducing the first set of inputs using the ranked set of weights to create a second set of inputs.

19. The method of claim 18, wherein the reducing the first set of input comprises:

sorting the first set of inputs.

20. The method of claim 19, further comprising:

removing lower N inputs;

evaluating a model accuracy; and reducing the first set of inputs when the model accuracy is greater than or equal to a threshold.

* * * * *